(12) United States Patent
Chau et al.

(10) Patent No.: US 12,019,946 B1
(45) Date of Patent: Jun. 25, 2024

(54) AUTOMATICALLY GENERATING FEEDBACK ABOUT CONTENT SHARED DURING A VIDEOCONFERENCE

(71) Applicant: Zoom Video Communications, Inc., San Jose, CA (US)

(72) Inventors: Vi Dinh Chau, Seattle, WA (US); Graeme Lambourne Geddes, Aliso Viejo, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 18/141,020

(22) Filed: Apr. 28, 2023

(51) Int. Cl.
*H04L 51/04* (2022.01)
*G06F 3/0482* (2013.01)
*G06F 3/0483* (2013.01)
*G06F 3/14* (2006.01)
*G06F 40/166* (2020.01)
*G06F 40/197* (2020.01)
*G06F 40/30* (2020.01)

(52) U.S. Cl.
CPC .......... *G06F 3/1454* (2013.01); *G06F 3/0482* (2013.01); *G06F 3/0483* (2013.01); *G06F 40/166* (2020.01); *G06F 40/197* (2020.01); *G06F 40/30* (2020.01); *H04L 51/04* (2013.01)

(58) Field of Classification Search
CPC .... G06F 3/1454; G06F 40/166; G06F 40/197; G06F 40/30; G06F 3/0482; G06F 3/0483; H04L 51/04
See application file for complete search history.

(56) References Cited

U.S. PATENT DOCUMENTS

| | | | |
|---|---|---|---|
| 11,080,356 B1* | 8/2021 | Kumar | G06F 16/9577 |
| 11,539,918 B1* | 12/2022 | Libin | H04L 65/4015 |
| 2008/0307324 A1* | 12/2008 | Westen | H04N 7/15 |
| | | | 715/753 |
| 2018/0260825 A1* | 9/2018 | Rashid | G06Q 30/0201 |
| 2020/0021453 A1* | 1/2020 | Advani | H04H 60/33 |
| 2021/0264929 A1* | 8/2021 | Osebe | G10L 21/003 |
| 2022/0188564 A1* | 6/2022 | Gudimetla | G06F 18/214 |

* cited by examiner

*Primary Examiner* — Daniel Samwel
(74) *Attorney, Agent, or Firm* — Kilpatrick Townsend & Stockton LLP

(57) ABSTRACT

Feedback can be automatically generated for visual content presented during a videoconference. For example, a system can receive a user selection of a file containing visual content to be presented to members of a video conference, wherein the visual content includes pages that are to be sequentially presented to the members during the video conference. The system can then facilitate presentation of the visual content to the members of the video conference. The system can also obtain metadata associated with at least one page of the visual content presented during the video conference, determine feedback about the at least one page by analyzing the metadata, and provide the feedback to an editor of the visual content.

20 Claims, 8 Drawing Sheets

US 12,019,946 B1

AUTOMATICALLY GENERATING FEEDBACK ABOUT CONTENT SHARED DURING A VIDEOCONFERENCE

TECHNICAL FIELD

The present application generally relates to videoconferencing and, more particularly, relates to automatically generating feedback about content shared during a videoconference.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
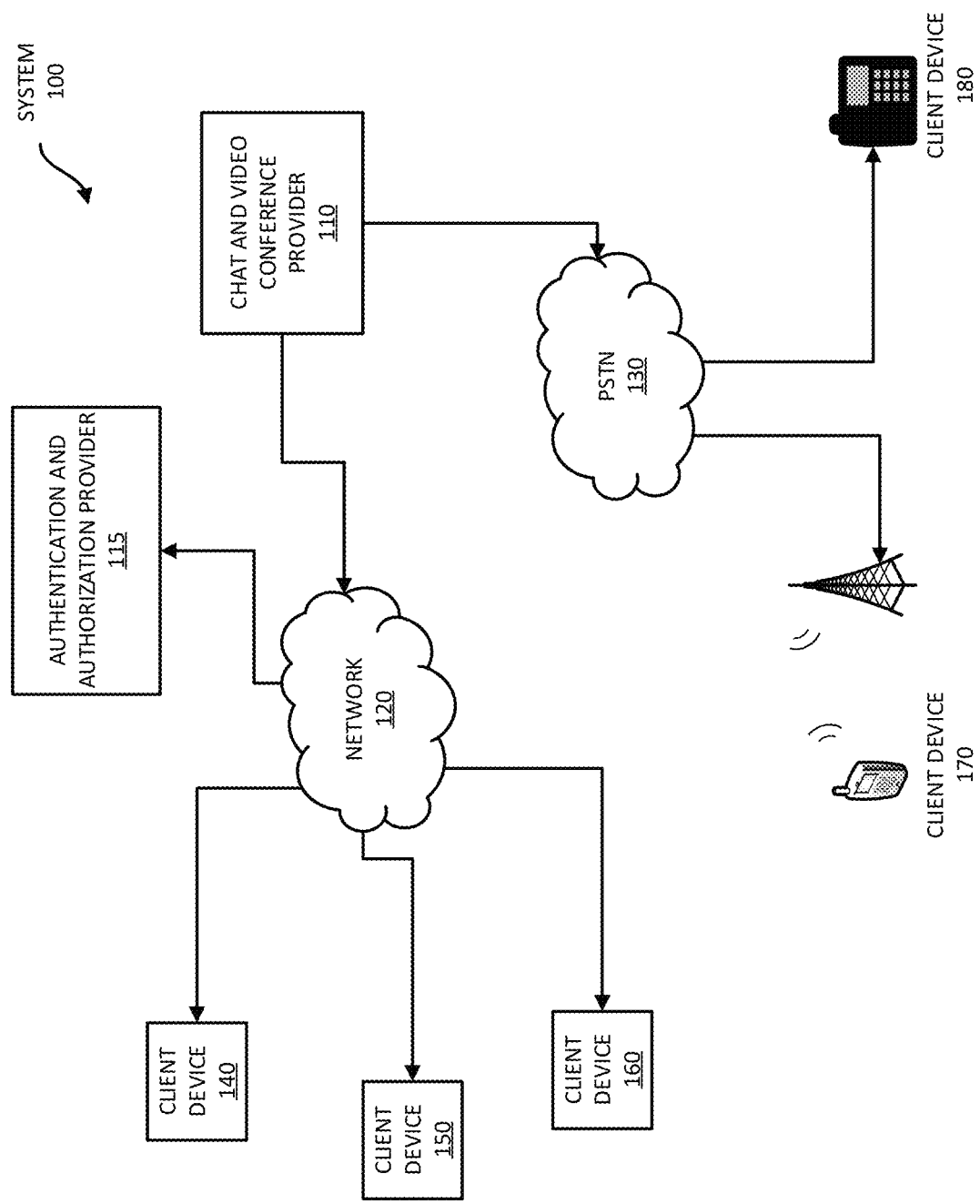
FIG. 1 shows an example of a system for providing videoconferencing and chat functionality to various client devices according to some aspects of the present disclosure.

Examples are described herein in the context of automatically generating feedback about content shared during a videoconference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive audio and video streams from the other participants and are presented with views of the video streams and audio from the audio streams. Using these different modalities, the participants can see and hear each other, engage more deeply, and generally have a richer experience despite not being physically in the same space.

In many circumstances, the participants of a videoconference may share visual content with one another. For example, during a webinar, a presenter can present a slideshow to the other participants of the videoconference. The slideshow can include a series of slides through which the presenter can share information about a particular topic. The participants may be able to ask the presenter questions and chat with one another throughout the course of the webinar. As another example, a presenter may share their screen, or an electronic document (e.g., a PDF file) that includes a series of pages, with the other participants of the videoconference. Different types of content may be shared among videoconference participants to achieve different objectives.

When a presenter shares content during a videoconference, it can be challenging for the presenter to obtain feedback about the effectiveness of the content in achieving a desired result. Unlike a live (e.g., in-person) meeting in which the presenter may converse with participants afterwards, for example to receive real-time feedback about the content of a slideshow, there is often little opportunity for these follow-up conversations in the videoconferencing context. And in a live meeting, the presenter can more easily gauge participants' interest in the content. Actions like participants entering and leaving the conference room, talking with one another, and making facial expressions are readily apparent. These types of engagement indicators are often lacking in the videoconferencing context. Participants may log on and off at various times throughout the course of a videoconference, have side-chats with one another, turn on and off their cameras and microphones, and mentally disengage in other ways that go relatively unnoticed to the presenter, because the presenter is not in the same physical room as the other participants. Although the videoconferencing software may output video streams of the participants to the presenter (assuming the participants have their cameras turned on), all of the video streams associated with all of the participants are normally output in the videoconferencing software at the same time. This makes it difficult for the presenter to analyze each individual participants' video stream for engagement queues, especially if there are a large number of participants in the videoconference.

Some examples of the present disclosure can overcome one or more of the abovementioned problems by providing a system that can automatically obtain (e.g., receive or generate) metadata related to the presentation of visual content during a videoconference, analyze the metadata to generate feedback associated with the visual content, and provide the feedback to an editor of the visual content. The feedback can include a recommendation as to how to improve at least one aspect of the visual content. Based on the feedback, the editor can make adjustments to the visual content. This can improve the effectiveness of the visual content the next time it is presented. The system can repeat this feedback process each time the visual content is presented in a videoconference, so that the quality of the visual content can be incrementally improved over time. In some examples, these and other features described herein may require authorization of the presenter, an account administrator, or another entity prior to use. For instance, a presenter may need to actively select an option in a control panel to enable the features described herein, so that these features are not implemented without the presenter's express authorization.

The system can use any suitable metadata or combination of metadata to determine the feedback. For example, the system can determine the feedback based on the video data (e.g., video streams) from the videoconference. The video data may depict the participants in the videoconference. These depictions may be analyzed using a trained machine-learning model to identify sentiment queues corresponding to different portions of the visual content. In particular, each participant's sentiment may change throughout the presentation of the visual content. Some portions (e.g., slides) of the visual content may elicit a positive sentiment while other portions may elicit a negative sentiment. The system can identify these sentiment queues and generate feedback based on the sentiment queues. For instance, the system can determine that a particular portion of the visual content elicited a negative sentiment from one or more participants in the videoconference and provide that information as feedback to the editor. The editor may then adjust that portion of the visual content accordingly, in an effort to elicit a more positive sentiment the next time that the visual content is presented. In some examples, participants may have to give their express authorization before the system will collect and/or analyze any metadata indicating their personal characteristics, such as their video data or audio data. Thus, the participants may be able to choose to opt into or out of the collection and analysis of such metadata.

A similar process can be applied to the audio data (e.g., the audio streams) from the videoconference. The system can directly analyze the audio data in its audio format using a trained machine-learning model, or convert the audio data into a text transcript of the videoconference that can be analyzed using a trained machine-learning model, to identify sentiment queues associated with different portions of the visual content. The system can then generate feedback based on the sentiment queues and provide that feedback to the editor. Based on a sentiment queue associated with a portion of the visual content, the editor may adjust the visual content accordingly.

Additionally or alternatively, other types of metadata may be analyzed to generate the feedback about the visual content. For example, the system can analyze meeting metrics to generate the feedback. The meeting metrics can be any metrics related to the videoconference meeting itself. Examples of the meeting metrics may include a start time of the videoconference, an end time of the videoconference, the number of participants in the meeting, times at which each participant joined and left the videoconference, etc. The meeting metrics may be indicative of participant engagement with the visual content, so they can be used to generate the feedback. For instance, if there were a large number of participants at the beginning of the presentation and far fewer participants at the end, it may suggest that participant engagement waned over time. This may suggest that the later portions of the visual content were less interesting to the participants than the earlier portions of the visual content. So, the system can generate feedback for the editor indicating that the later portions of the visual content may need improvement.

Presentation metrics may also be analyzed to generate the feedback. The presentation metrics can be any metrics related to the presentation of the visual content during the videoconference. Examples of the presentation metrics can include a start time of the presentation, an end time of the presentation, a time duration of the presentation as a whole, a respective time duration associated with each individual page (e.g., slide) of the presentation, an average time duration associated with a page of the presentation, etc. The presentation metrics may indicate areas ripe for improvement. For example, if the presenter spent more time on presenting one particular slide than the other slides, and that particular slide also elicited a negative sentiment from the participants, this combination of factors may indicate that there is too much information on that particular slide or that the presenter is spending too long presenting that slide. So, the system can generate feedback indicating the same to the editor.

As alluded to above, the system can determine which specific portions of the visual content correspond to different parts of the metadata. For instance, the system can determine a respective time segment corresponding to each discrete portion of the visual content. This time segment can be the timeframe during which the presenter presented that specific portion of the other participants. After determining which time segment of the presentation corresponds to each respective portion of the visual content, the system can analyze the metadata associated with that time segment to determine specific feedback for a specific portion of the visual content. For instance, the system can determine that a participant in the videoconference had a certain sentiment or other emotional reaction during a particular time segment corresponding to a particular slide of a slideshow. So, the system can link the emotional reaction to that particular slide, in the sense that the system can determine that the two things are related. The system can then generate feedback that is specific to that particular slide based on the emotional reaction of the participant. In this way, the system can tailor the feedback to individual portions (e.g., slides) of the visual content, so that the feedback can be more granular.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
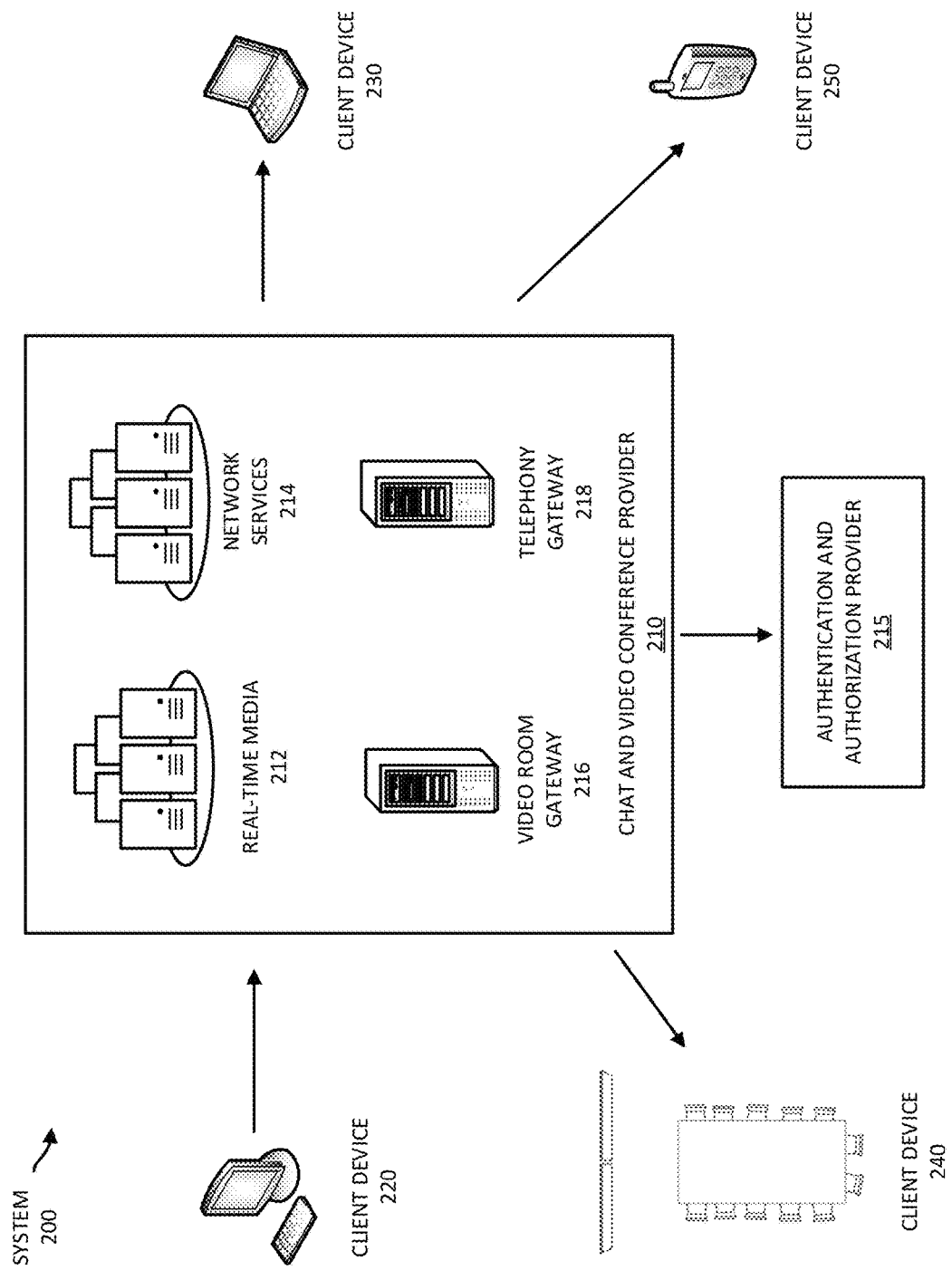
FIG. 2 shows another example of a system for providing videoconferencing and chat functionality to various client device according to some aspects of the present disclosure.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, the client devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
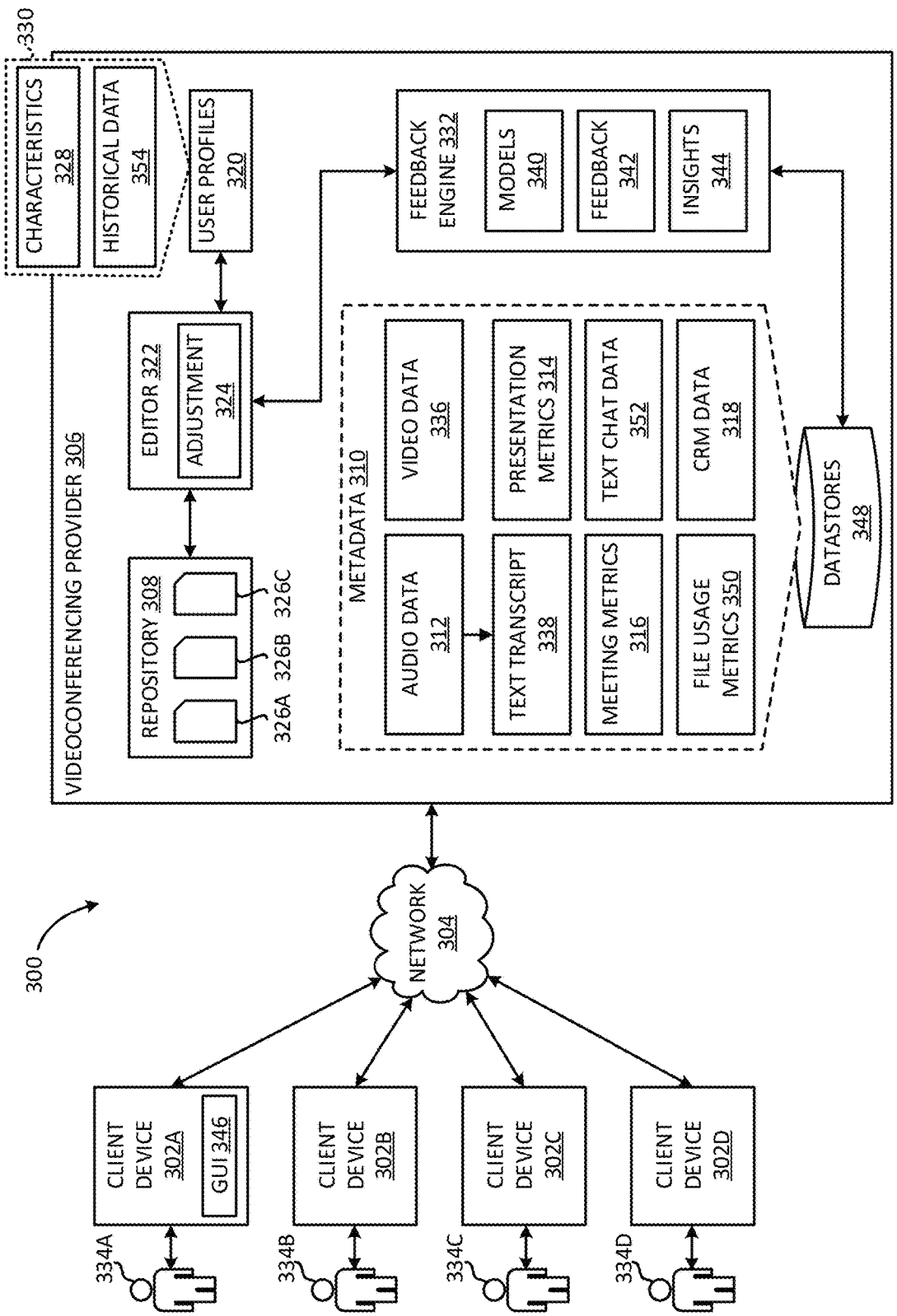
FIG. 3 shows an example of a system for generating feedback about content shared during a videoconference according to some aspects of the present disclosure.

FIG. 3 shows an example of a system 300 for generating feedback about content shared during a videoconference according to some aspects of the present disclosure. In this example, the system 300 includes client devices 302a-d associated with participants 334a-d of a videoconference meeting. The videoconferencing meeting is hosted by a videoconferencing provider 306, which may be similar to the chat and video conference providers 110, 210 of FIGS. 1-2. The client device 302a-d can communicate with the videoconferencing provider 306 via one or more communication networks 304, such as the Internet.

During the videoconferencing meeting, a participant 334a may decide to share content (e.g., visual content) with the other participants 334b-d. For instance, the participant 334a may decide to present a PowerPoint® slideshow to the other participants 334b-d of the videoconference. To begin sharing the content, the participant 334a can interact with an option in a graphical user interface (GUI) 346 output by their client device 302a. The GUI 346 may be part of the videoconferencing software running on the client device 302a to facilitate the videoconferencing meeting. For example, the participant 334a may open a slideshow on the client device 302a and select a screen sharing option in the GUI 346. Selecting the screen sharing option may allow the participant 334a to share their screen, and thus the slideshow displayed thereon, to the rest of the participants 334b-d.

In other examples, the participant 334a may select the content that they want to share from a menu of content options, which can list any number of content options that are available for sharing. The menu can be part of the GUI 346 and automatically populated, for example based on the files 326a-c in a repository 308. The repository 308 can be internal to the videoconferencing provider 306, as shown in FIG. 3, or can be external to the videoconferencing provider 306 and accessible to the videoconferencing provider 306. Any number of users can add files (e.g., slideshows, electronic documents, etc.) to the repository 308, for example by uploading the files to the repository 308 using their client devices. Adding a file to the repository 308 can automatically make the file available for sharing by anyone with appropriate privileges. Different files 326a-c in the repository 308 can be assigned to different privilege levels, such that only the users with appropriate privileges can view and share the files.

After the participant 334a selects which content to present, the system 300 can begin sharing the content with the other participants 334b-d. This can be achieved by the videoconferencing provider 306 interfacing with the videoconferencing software on client devices 302b-d. Over the course of the presentation, the participants 334a-d can have discussions, ask questions to one another, engage in chats, participate in breakout sessions, and perform other activities related to the presentation. Eventually, the presentation will end and the participants will leave the videoconferencing meeting.

During and/or after the videoconference, the videoconferencing provider 306 can automatically obtain (e.g., receive or generate) metadata 310 associated with the videoconference. Examples of such metadata 310 can include the video data 336, audio data 312, and text chat data 352 from the videoconferencing meeting. The videoconferencing provider 306 can also obtain various types of metrics. For example, the videoconferencing provider 306 can obtain meeting metrics 316, presentation metrics 314, file usage metrics 350, and other metrics. The meeting metrics 316 can be any metrics about the videoconferencing meeting itself, such as the start and end times of the meeting, the length of the meeting, the number of participants at various points throughout the meeting, the host of the meeting, etc. The presentation metrics 314 can be any metrics about the presentation itself, such as the start and end time of the presentation, the length of the presentation, the average time-per-page during the presentation, etc. The file usage metrics 350 can be any metrics about the content file (e.g., file 326a) itself, such as the number of times the content file has been presented, the frequency with which it has been presented, its last update time, etc. In some examples, the audio data 312 can be automatically processed to generate a text transcript 338 of the videoconferencing meeting. For example, the videoconferencing provider 306 can generate the text transcript 338 using any suitable speech-to-text converter. Some or all of the metadata 310 can be stored in one or more datastores 348 of the videoconferencing provider 306.

In some examples, the videoconferencing provider 306 can receive at least some of the metadata 310 from a remote system. For example, the videoconferencing provider 306 can receive permission to access customer relationship management (CRM) data 318 from a CRM system, which may be part of or remote from the videoconferencing provider 306. For instance, the CRM system may be operated by a company associated with the presenter (e.g., participant 334), where the company is different from the videoconferencing provider 306. The CRM data 318 can be related to some or all of the other participants 334b-d in the videoconference. Examples of the CRM data 318 may include the companies, job titles, and purchase histories associated with the participants 334b-d or their companies. The CRM data 318 can then be used to generate feedback, as will be described in greater detail later on. This may be particularly useful if the presentation is a sales presentation and the other participants 334b-d are potential or existing customers, though other contexts are contemplated herein.

After obtaining the metadata 310 related to the presentation of the visual content during the videoconference, the videoconferencing provider 306 can execute a feedback engine 332 that is configured to analyze the metadata 310 to generate feedback 342 associated with the visual content. The feedback engine 332 can include one or more models 340 usable to derive insights 344 from any combination of the metadata 310. Examples of the models 340 can include neural networks, decision trees, classifiers, or other machine-learning models. The insights 344, in turn, can then be used to generate the feedback 342.

For example, the models 340 can include a sentiment analysis model. The sentiment analysis model can be a machine-learning model that has been trained on a training dataset. The sentiment analysis model can be configured to analyze audio, text, and/or video data to determine corresponding sentiments. As one particular example, the feedback engine 332 can select at least some of the audio data 312, such as an audio stream associated with he participant 334b, as the input data for the sentiment analysis model. As another example, the feedback engine 332 can select at least some of the video data 336, such as a video stream associated with the participant 334b, as the input data for the sentiment analysis model. As still another example, the feedback engine 332 can select at least some of the text chat data 352, such as the chat messages sent by the participant 334b, as the input data for the sentiment analysis model. In any of the above examples, the sentiment analysis model can analyze the input data for various sentiment queues and generate an output indicating one or more predicted sentiments of the participant 334b at various points throughout the presentation. For example, the sentiment analysis model can output a time series indicating the different sentiments (e.g., positive, negative, or neutral) of the participant 334b over the course of the presentation. The feedback engine 332 can repeat this process for some or all of the video streams, audio streams, and/or chat messages for some or all of the other participants 334b-d in the videoconference to develop a sentiment profile for each participant over the course of the presentation.

After developing the sentiment profiles for the participants 334b-d of the videoconference, the feedback engine 332 can determine one or more insights 344 based on the sentiment profiles. For example, the feedback engine 332 can determine that multiple participants 334b-d had a negative sentiment during a particular page (e.g., slide) of the presentation. This insight can be useful in identifying areas of improvement and may suggest a problem with the content of the page. In some examples, the feedback engine 332 may further determine (e.g., based on CRM data 318) a job type or other characteristic associated with each of the participants that had a negative reaction. If the participants that had the negative reaction all have the same or similar characteristics, it may suggest that something about the slide is not resonating with those particular viewers. For instance, the feedback engine 332 may determine that the engineers participating in the videoconference had a neutral or positive reaction to a particular slide, while the salespeople participating in the videoconference had a negative reaction to the slide. This may be a useful insight, particularly if the target audience is the latter.

Other insights 344 can also be determined based on the metadata 310. For example, the feedback engine 332 can analyze the text transcript 338 to determine that a certain portion of the visual content elicited a relatively large number of questions, suggesting that the portion may be in need of revision and further clarification. As another example, the feedback engine 332 can analyze the text chat data 352 to determine that a number of the participants 334b-d were having side chats during a certain portion of the visual content, suggesting disengagement and lack of interest in that portion. As another example, the feedback engine 332 can analyze the meeting metrics 316 to determine that the number of the participants 334b-d in the videoconference decreased over the course of the presentation (e.g., by an abnormal amount), suggesting disengagement and lack of interest in the presentation. As still another example, the feedback engine 332 can analyze the file usage metrics 350 to determine that the content file is rarely used and has not been recently updated (e.g., updated within a threshold timeframe), suggesting that the presentation may lack relevance. As yet another example, the feedback engine 332 can analyze the CRM data 318 to determine that less than a threshold number of participants 334b-d in the videoconference converted (e.g., purchased the item or service described in the presentation), suggesting that the presentation was ineffective. As is apparent, the insights 344 may have different levels of granularity. Some insights 344 may apply to the visual content as a whole, while others may apply to individual portions (e.g., pages or slides) of the visual content.

The feedback engine 332 can also derive insights 344 from combinations of the metadata 310. For example, the feedback engine 332 can analyze the presentation metrics 314 to determine that the presenter spent an abnormally long time on a particular portion of the presentation. The feedback engine 332 can also determine, using the sentiment analysis model, that the particular portion of the presentation happened to elicit negative sentiment from a large number of viewers. Based on the combination of these two factors, the feedback engine 332 may develop an insight 344, for example that the particular portion contains too much information, is overly complex, or is otherwise in need of revision. As another example, the feedback engine 332 analyze the file usage metrics 350 to determine that the content file (e.g., file 326a) is rarely accessed. The feedback engine 332 also analyze the meeting metrics 316 to determine that the videoconference was not well attended (e.g., the number of participants 334b-d was less than a predefined threshold). Based on the combination of these two factors, the feedback engine 332 may develop an insight 344, for example that the presentation is outdated or uninteresting.

As alluded to above, the feedback engine 332 can determine which portions of the metadata 310 correspond to which portions of the visual content. For example, the feedback engine 332 can determine a respective time segment corresponding to each discrete portion of the visual content. The feedback engine 332 can then determine which portion of the metadata 310 corresponds to that time segment. Using this approach, the feedback engine 332 can link certain parts of the metadata 310 and certain insights 344 to its corresponding visual content, allowing for a more granular level of feedback.

To determine which time segment corresponds to a given portion of the visual content, in some examples the feedback engine 332 can identify visual transitions in the visual content, such as slide transitions in a slideshow or page transitions between pages of an electronic document. To identify the visual transitions, the feedback engine 332 can automatically analyze the video data 336 associated with the presentation using one or more models 340 and/or image-processing techniques. For instance, a trained machine-learning model can be applied to the video data 336 to detect transitions in the video data 336. Alternatively, other ways of detecting the visual transitions may be used. For example, the videoconferencing provider 306 can receive a transition notification each time the presenter 334a manually commands their client device 302a to transition to the next page (e.g., slide) of the visual content. Based on the timing of the transition notifications, the feedback engine 332 can determine which time segments correspond to which portions of the visual content.

As one particular example, the feedback engine 332 can employ the techniques described above to determine that a particular slide of a slideshow was presented during a time segment extending from a first time (e.g., 5 minutes and 32 seconds) to a second time (e.g., 6 minutes and 47 seconds). The feedback engine 332 can then analyze the text chat data 352 or other metadata 310 to determine an insight 344—e.g., that a participant 334b in the videoconference had a certain sentiment or other emotional reaction during that same time segment. So, the feedback engine 332 can link the insight 344 to that particular slide, in the sense that the system can determine that the two things are related. The feedback engine 332 can use the insight 344 to generate feedback 342 that is specific to that particular slide.

After generating the insights 344, the feedback engine 332 can generate feedback 342 for improving the visual content. The feedback 342 can include some or all of the insights 344. In generating the feedback 342, the feedback engine 332 may organize the insights 344 based on their applicability. For example, the feedback engine 332 can group together all of the higher-level insights related to the visual content as a whole into a first group, and then group together all of the lower-level insights related to individual portions into a second group. Within the second group, the lower-level insights may be further organized by the portions of the visual content to which they correspond. This organizational hierarchy can make it easier to digest the insights and understand their applicability. The feedback 342 can have any suitable format, such as a JSON, XML, or other declarative format.

The feedback engine 332 can transmit the feedback 342 to an editor 322 associated with the visual content. Based on the feedback 342, the editor 322 can determine one or more adjustments 324 to make to the visual content. To determine which adjustments to make based on the feedback 342, the editor 322 can use any suitable approach. For instance, the editor 322 may have access to a predefined lookup table that maps certain feedback to certain types of adjustments. Additionally or alternatively, the editor 322 can include predefined logic that is executed based on the feedback 342 to identify the appropriate adjustments to make based on the feedback 342. After determining which adjustments 324 to make, the editor 322 can then make those adjustments 324 to the corresponding content file (e.g., file 326a), in an effort to improve the visual content. That way, the next time the visual content is presented, it may be received better by the audience. Although the editor 322 shown in FIG. 3 is software that can automatically make said adjustments 324, it will be appreciated that in other examples the editor may be a human (e.g., the presenter of the visual content) that can manually determine and apply said adjustments 324. In those examples, the feedback engine 332 can transmit the feedback 342 to a client device of the editor via the one or more communication networks 304.

In addition to generating feedback 342 after the presentation has already been given, in some examples the videoconferencing provider 306 (e.g., editor 322) can automatically and preemptively tailor the visual content to the presenter (or a participant in the video conference) before the presentation is given. For example, the visual content may be used by multiple presenters to give multiple presentations to different audiences about the same topic. Some features of the visual content can be predesignated as dynamically adjustable and other features of the visual content can be predesignated as fixed. Examples of the dynamically adjustable features can include an order of the pages in the visual content, heading text used on a page of the visual content, non-heading text used on a page of the visual content, an image used in the visual content, etc. The videoconferencing provider 306 can determine that a certain presenter (e.g., participant 334a) is going to present the visual content during a videoconference, for example based on the presenter selecting the visual content for presentation through the GUI 346 on their client device 302a. In response to making this determination, the videoconferencing provider 306 can obtain a profile 330 associated with the presenter, from among a set of user profiles 320. Based on the profile 330, the videoconferencing provider 306 may automatically adjust one or more of the dynamically adjustable features in the visual content (e.g., in real-time during the presentation or prior to the presenter starting to give the presentation).

For example, the profile 330 can include historical data 354 about how the presenter has presented the visual content in the past. The videoconferencing provider 306 can collect and store this historical data 354 over the course of multiple presentations by the presenter. The historical data 354 may indicate, for example, that a page of the visual content is routinely skipped by the presenter, an order in which the presenter has historically presented the pages of the visual content (which may not necessarily be the same as the order in which the pages are arranged in the visual content), certain terms or phrases historically used by the presenter when describing certain topics or pages of the visual content, etc. The profile 330 may additionally or alternatively include one or more characteristics 328 of the presenter, such as the presenter's name, employer, job title, home state, e-mail address, biography, presentation style, phone number, home address, interests, hobbies, etc. Based on the presenter's profile 330, the visual content can be automatically customized to the presenter by the editor 322.

As one such example, the videoconferencing provider 306 may automatically generate a new, custom version of the visual content in which the pages of the visual content are reordered to be consistent with the order in which the presenter has presented the visual content in the past. As another example, in the custom version, the videoconferencing provider 306 may automatically remove a page that is routinely skipped by the presenter. As still another example, in the custom version, the videoconferencing provider 306 may automatically fill in a front page of the visual content with the presenter's name, photo, title, phone number, and e-mail address. As yet another example, in the custom version, the videoconferencing provider 306 may automatically replace an existing term in the visual content with a preferred term historically used by the presenter. In this way, dynamically adjustable features of the visual content can be automatically tailored to each presenter by the videoconferencing provider 306. Conversely, features that are predesignated as fixed may not be automatically adjusted in this way by the videoconferencing provider 306. Once the presenter is done giving the presentation, the videoconferencing provider 306 can remove the custom from memory to conserve space. Alternatively, the videoconferencing provider 306 can retain the custom version for future use by the presenter, so that the videoconferencing provider 306 does not need to re-generate the custom version each time the presenter gives the presentation.

Figure 4:
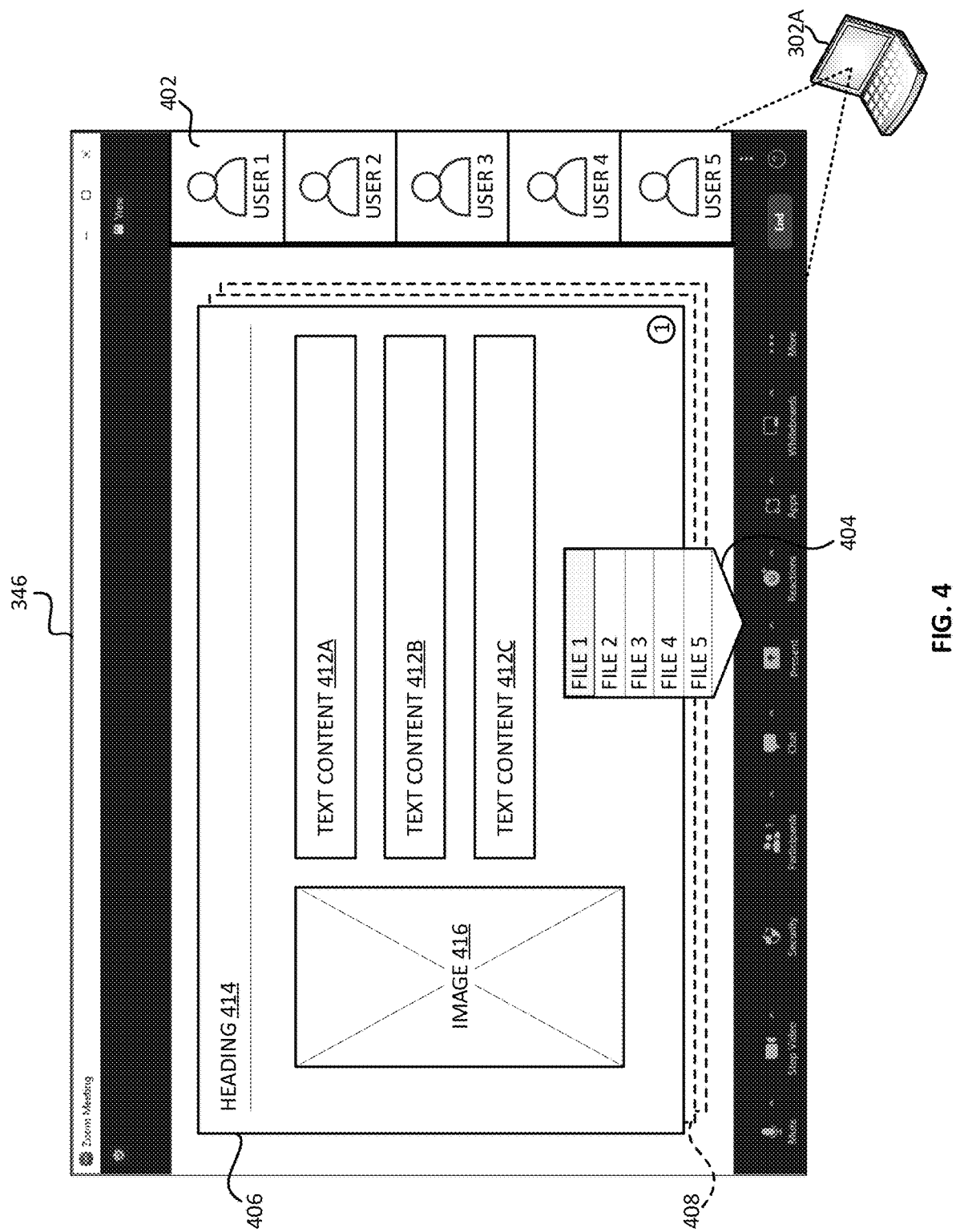
FIG. 4 shows an example of a graphical user interface for selecting content to share during a videoconference according to some aspects of the present disclosure.

Turning now to FIG. 4, shown is an example of the GUI 346 output on the client device 302a of the presenter according to some aspects of the present disclosure. As shown, the GUI 346 can include video streams 402 of the other participants in the videoconference. The GUI 346 can also include a menu 404 through which the presenter can select a content file for presentation to the other participants. As described earlier, in some examples, the menu 404 can be populated based on the files in a repository, which may be predesignate d for storing shareable content.

In the example shown in FIG. 4, the presenter has selected "File 1" for sharing with the other participants in the videoconference. That file can correspond to the visual content 406 shown in the middle of the GUI 346. The visual content 406 can include any number of distinct, sequential portions 408 (e.g., pages or slides) that can be sequentially presented to the other participants in the videoconference. Each of the portions 408 can include its own images 416, headings 414, text content 412a-b, and/or other visual features. The presenter may be able to transition back-and-forth between the portions 408 by supplying inputs to the client device 302a, such as by pressing arrow keys on the keyboard.

Some of the visual features in a given portion 408 of the visual content 406 may be dynamically adjustable by the videoconferencing provider. Such visual features can be dynamically adjusted based on a characteristic of the presenter or a characteristic of a recipient of the presentation. Examples of such characteristics may include a name, employer, job title, interest, preference, age, physical location, phone number, physical address, e-mail address, etc. For example, if the recipient of the presentation corresponds to a particular company, the heading 414 or the image 416 may be dynamically adjusted to reference that particular company (e.g., to be the company's logo). As another example, the sequence of the portions 408 may be dynamically adjusted, for example based on a priority order assigned to the topics described in each of the portions, where the priority order is selected by the presenter or the recipient of the presentation. As still another example, the text content 412c may be dynamically removed from the presentation based on the historical data (e.g., presentation history) associated with the presenter. The dynamic adjustments can be made in real-time after the presentation has begun, or they can be made prior to the presentation beginning.

Other visual features in a given portion 408 may be fixed, so that they cannot be dynamically adjusted by the videoconferencing provider. In some examples, the various visual features in a given portion 408 of the visual content 406 can be predesignated as adjustable or fixed, for example by the content creator flagging them as such in corresponding configuration data. This can notify the videoconferencing provider of which visual features are allowed to be automatically edited and which are locked against editing.

Figure 5:
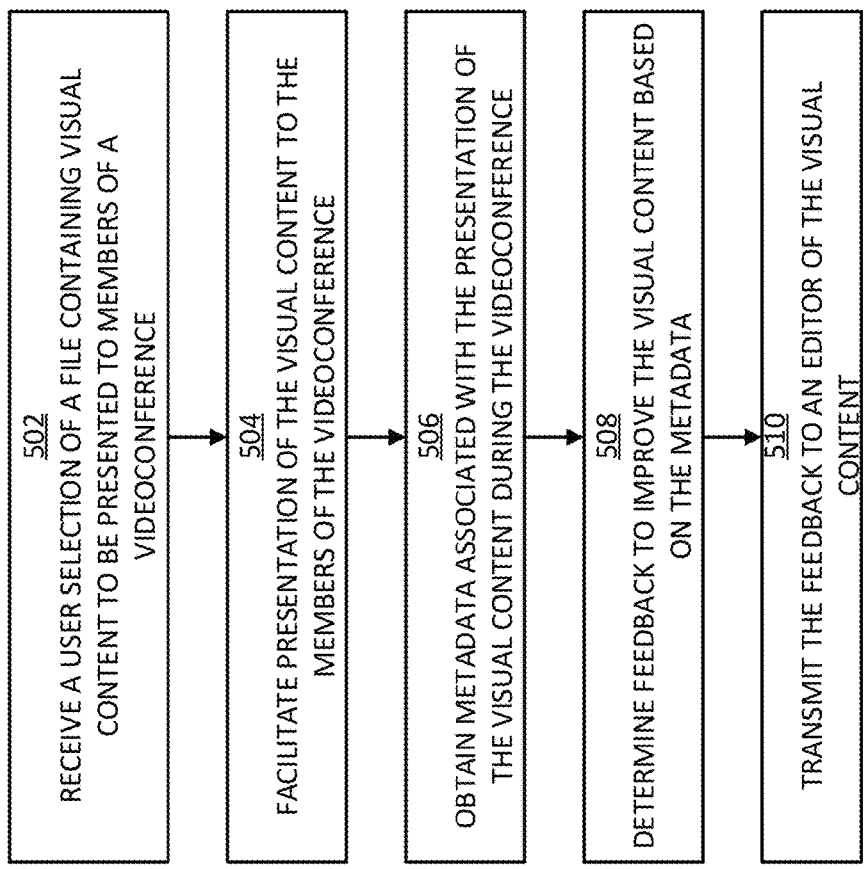
FIG. 5 shows a flowchart of an example of a process for generating feedback about content shared during a videoconference according to some aspects of the present disclosure.

Turning now to FIG. 5, shown is a flowchart of an example of a process for generating feedback about content shared during a videoconference according to some aspects of the present disclosure. Other examples may include more operations, fewer operations, different operations, or a different sequence of operations than is shown in FIG. 5. The operations of FIG. 5 are described below with reference to the components of FIG. 3 described above.

In block 502, a videoconferencing provider 306 receives a user selection of a file 326a containing visual content to be presented to members 334b-d (e.g., participants) of a videoconference. The videoconferencing provider 306 can receive the user selection from a client device 302a of the user via a communications network 304.

In block 504, the videoconferencing provider 306 facilitates the presentation of the visual content to the members 334b-d of the videoconference. For example, the videoconferencing provider 306 can route a video stream and an audio stream from the client device 302a of the presenter to the other client devices 302b-d of the recipients of the presentation. The videoconferencing provider 306 can also transmit the visual content to the members 334b-d, for example as part of the video stream from the client device 302a or as a separate video stream. Either way, though, the visual content is distinct from a live video stream from the presenter's camera. The visual content can include a sequence of discrete, predefined portions to be presented in a sequential order to the recipients.

In block 506, the videoconferencing provider 306 obtains metadata 310 associated with the presentation of the visual content during the videoconference. Examples of the metadata 310 can include audio data 312, video data 336, text chat data 352, a text transcript 338, meeting metrics 316, presentation metrics 314, file usage metrics 350, etc. The videoconferencing provider 306 can obtain the metadata 310 from any suitable source. In some examples, the videoconferencing provider 306 can generate at least a portion of the metadata 310.

In block 508, the videoconferencing provider 306 determines feedback 342 to improve the visual content based on the metadata 310. The videoconferencing provider 306 can use one or more models 340, lookup tables, predefined thresholds, or algorithms to determine the feedback 342. For example, the videoconferencing provider 306 can determine that a certain percentage of participants that originally joined the videoconference left after a particular slide. If the percentage exceeds a predefined threshold (e.g., if the percentage is beyond a normal attrition rate during a presentation), it may suggest that the slide was somehow off-putting to the participants. So, the videoconferencing provider 306 can incorporate this insight into the feedback 342. As another example, the videoconferencing provider 306 can compare a text transcript 338 of the presentation to the visual content to identify similarities and differences between the two. If, for example, the presenter used certain terms and phrases in their oral presentation that were different than those used on a particular slide, it may suggest a terminology misalignment. If the videoconferencing provider 306 also determined that there was a negative sentiment or an abnormal number of questions associated with that particular slide, it may suggest that the terminology misalignment led to confusion. So, the videoconferencing provider 306 can incorporate this insight into the feedback 342.

In block 510, the videoconferencing provider 306 transmits the feedback 342 to an editor (e.g., editor 322) of the visual content. The editor can determine at least one adjustment 324 to make to the visual content based on the feedback 342 and then modify the corresponding file 326a to apply the adjustment 324. The adjustment 324 may involve adding visual features to the visual content, deleting existing visual features from the visual content, moving visual features in the visual content, and/or reordering discrete portions of the visual features (so that a portion comes earlier or later in the presentation as compared to its current position). The editor can automatically determine and apply such adjustments 324, in some examples, by opening and editing the file 326a.

Figure 6:
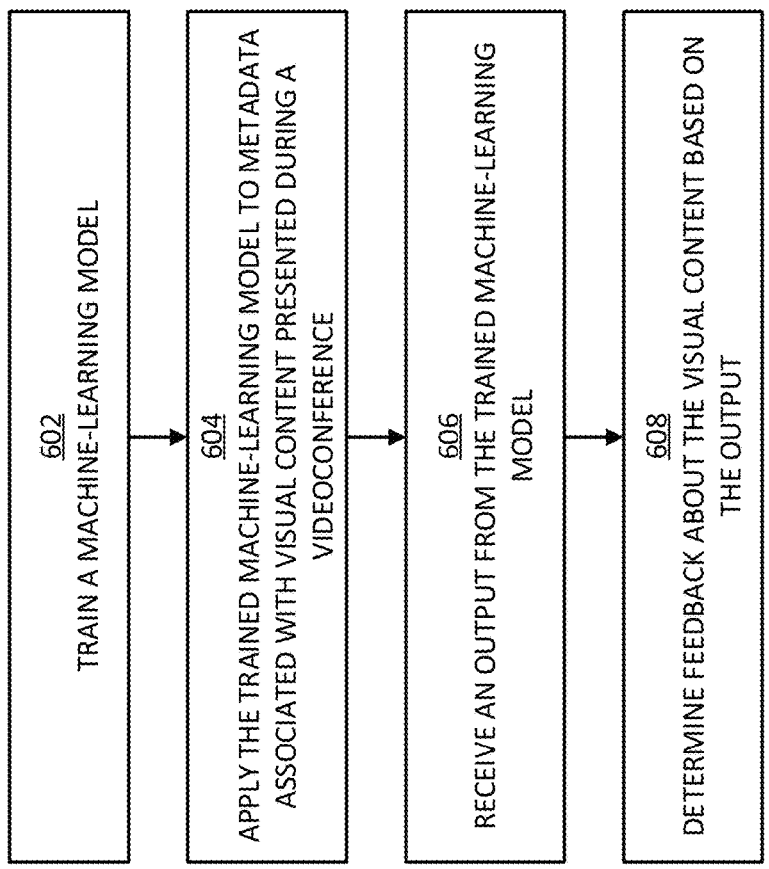
FIG. 6 shows a flowchart of an example of a process for generating feedback about content shared during a videoconference using a trained machine-learning model according to aspects some of the present disclosure.

Turning now to FIG. 6, FIG. 6 shows a flowchart of an example of a process for generating feedback about content shared during a videoconference using a trained machine-learning model according to aspects some of the present disclosure. Other examples may include more operations, fewer operations, different operations, or a different sequence of operations than is shown in FIG. 6. The operations of FIG. 6 are described below with reference to the components of FIG. 3 described above.

In block 602, the videoconferencing provider 306 or another entity trains a machine-learning model, which can be one of the models 340 used by the feedback engine 332 to generate the feedback 342. Training the machine-learning model can involve iteratively tuning the model's parameters based on training data. The training process can employ supervised, semi-supervised, unsupervised, or reinforcement learning techniques.

In some examples, the training data may include audio, video, or text data, depending on whether the machine-learning model is configured to process input in the form of audio, video, or text data. In some examples, the machine-learning model is a sentiment analysis model configured to receive an input associated with a presentation of visual content during a videoconference. Based on the input, the machine-learning model can generate an output indicating one or more sentiments of one or more participants that viewed the presentation during the videoconference.

In block 606, the videoconferencing provider 306 receives an output from the trained machine-learning model. As noted above, the output may indicate indicating sentiment and/or other information.

In block 608, the videoconferencing provider 306 determines feedback about the visual content based on the output. This operation can be performed using any of the techniques described above.

Figure 7:
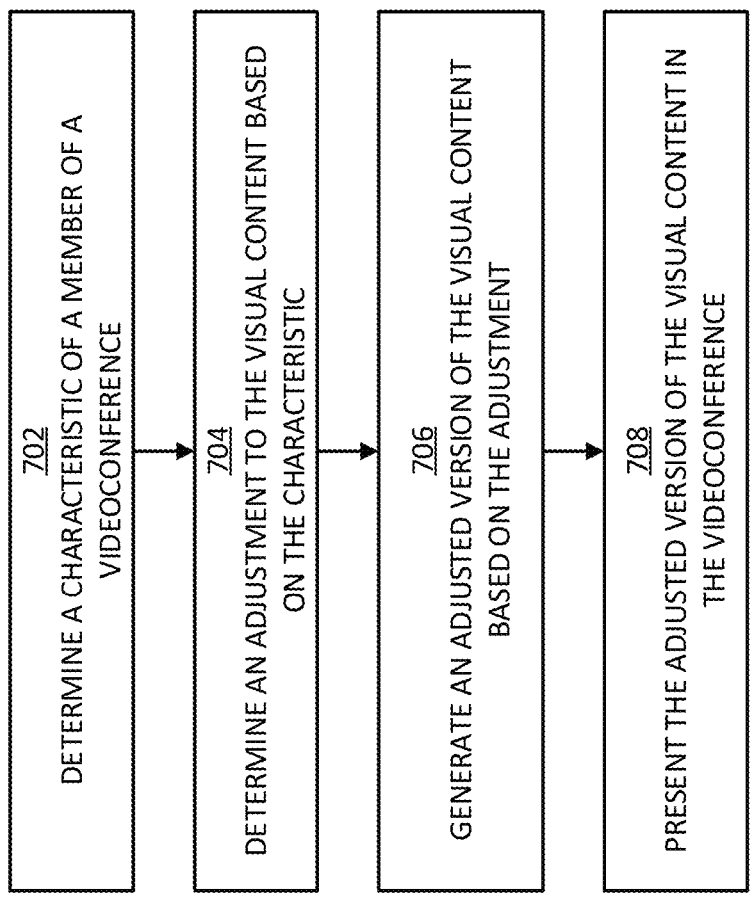
FIG. 7 shows a flowchart of an example of a process for automatically adjusting content based on a characteristic of a participant in a videoconference according to some aspects some of the present disclosure.

Turning now to FIG. 7, shown is a flowchart of an example of a process for automatically adjusting content based on a characteristic of a participant (e.g., member) in a videoconference according to some aspects some of the present disclosure. Other examples may include more operations, fewer operations, different operations, or a different sequence of operations than is shown in FIG. 7. The operations of FIG. 7 are described below with reference to the components of FIG. 3 described above.

In block 702, the videoconferencing provider 306 determines a characteristic of a member of a videoconference. The member may be a presenter of visual content during the videoconference or a non-presenter of the visual content during the videoconference. Examples of the characteristic can include an identity, a presentation style, interests, a job type or title, a demographic characteristic, etc. To determine the characteristic, in some examples the videoconferencing provider 306 can access a profile 330 associated with the member. The profile 330 can include any number of characteristics 328 of the member. The videoconferencing provider 306 can store, maintain, and update any number of user profiles 320 associated with any number of users.

In block 704, the videoconferencing provider 306 determines an adjustment 324 to make to the visual content based on the characteristic. For example, the videoconferencing provider 306 can remove a feature from the visual content based on the characteristic. As another example, the videoconferencing provider 306 can add a feature from the visual content based on the characteristic. As yet another example, the videoconferencing provider 306 can move a feature in the visual content based on the characteristic. By determining the adjustment 324 based on one or more of the member's characteristics, the visual content can be customized to be more relevant to that member.

In some examples, the videoconferencing provider 306 can determine the adjustment 324 based on historical data 354 associated with the member, additionally or alternatively to the characteristics 328 of the member. If the member is the presenter of the visual content, the historical data 354 may describe aspects of prior presentations given by the presenter. If the member is not the presenter of the visual content, the historical data 354 may describe aspects of previous presentations watched by the member.

In block 706, the videoconferencing provider 306 automatically generates and adjusted version of the visual content based on the adjustment 324. This may involve opening and editing a file 326a storing the visual content. In some examples, the videoconferencing provider 306 may generate a copy (e.g., a temporary copy) of the file 326a to which the adjustment 324 is applied, to avoid modifying the original copy of the file 326a. This can allow the original copy of the file 125a to serve as a fixed baseline to which adjustments are dynamically made for various presentations.

In block 708, the videoconferencing provider 306 presents the adjusted version of the visual content in the videoconference (e.g., to the members of the videoconference). For example, the videoconferencing provider 306 can transmit the adjusted version of the visual content to the client devices of the members of the videoconference. The presentation of the adjusted version of the visual content can be controlled by the presenter 334a, for example by issuing commands to the videoconferencing provider 306 via their client device 302a.

Figure 8:
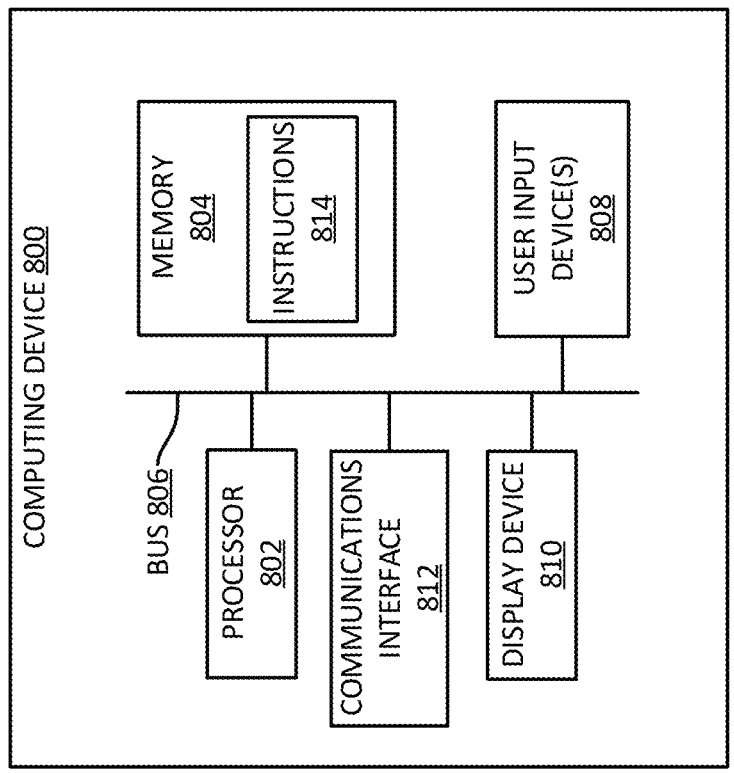
FIG. 8 shows a block diagram of an example of a computing device usable to implement some aspects of the present disclosure.

Turning now to FIG. 8, shown is a block diagram of an example of a computing device 800 usable to implement some aspects of the present disclosure. In some examples, the computing device 800 may correspond to any of the client devices or videoconference providers described above.

The computing device 800 includes a processor 802 that is in communication with the memory 804 and other components of the computing device 800 using one or more communications buses 806. The processor 802 is configured to execute processor-executable instructions 814 stored in the memory 804 to perform one or more processes described herein.

As shown, the computing device 800 also includes one or more user input devices 808 (e.g., a keyboard, mouse, touchscreen, video capture device, and/or microphone) to accept user input and the display device 810 to provide visual output to a user. The computing device 800 further includes a communications interface 812. In some examples, the communications interface 812 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising receiving, by one or more processors, a user selection of a file containing visual content to be presented to members of a video conference, wherein the visual content includes pages that are to be sequentially presented to the members during the video conference; facilitating, by the one or more processors, presentation of the visual content to the members of the video conference; obtaining, by the one or more processors, metadata associated with at least one page of the visual content presented during the video conference; determining, by the one or more processors, feedback about the at least one page by analyzing the metadata; and providing, by the one or more processors, the feedback to an editor of the visual content.

Example #2: The method of Example #1, wherein the metadata includes audio data and video data from the video conference.

Example #3: The method of Example #2, further comprising: determining, using a trained machine-learning model, a sentiment associated with a member of the video conference based on the audio data or the video data; and determining the feedback based on the sentiment.

Example #4: The method of any of Examples #1-3, wherein the metadata includes text chat data from the video conference.

Example #5: The method of Example #4, further comprising: analyzing the text chat data using a trained machine-learning model to determine a sentiment associated with a member of the video conference; and determine the feedback based on the sentiment.

Example #6: The method of any of Examples #1-5, wherein the metadata includes meeting metrics related to the video conference.

Example #7: The method of any of Examples #1-6, wherein the metadata includes file usage metrics related to the file.

Example #8: The method of any of Examples #1-7, wherein the metadata includes presentation metrics related to the presentation of the visual content.

Example #9: The method of any of Examples #1-8, wherein the feedback is a recommendation as to how to improve the at least one page of the visual content.

Example #10: The method of any of Examples #1-9, wherein the editor is software configured to: receive the feedback; and automatically adjust a feature of the visual content based on the feedback.

Example #11: The method of Example #10, wherein the feature is a text field in the visual content, and wherein automatically adjusting the feature involves modifying a value of the text field from a first text value to a second text value.

Example #12: The method of Example #10, wherein the feature is a sequential order of the pages in the visual content, and wherein automatically adjusting the feature involves modifying the sequential order from a first order to a second order.

Example #13: The method of any of Examples #1-12, wherein the visual content is a slideshow and the pages are slides of the slideshow.

Example #14: The method of any of Examples #1-13, further comprising, after receiving the user selection and prior to facilitating the presentation of the visual content to the members of the video conference: automatically generating, by the one or more processors, an adjusted version of the visual content by modifying the visual content based on a profile associated with a member of the video conference; and facilitating the presentation of the adjusted version of the visual content to the members of the video conference.

Example #15: The method of Example #14, wherein the member is a presenter of the visual content in the video conference.

Example #16: The method of Example #14, wherein the member is not a presenter of the visual content in the video conference.

Example #17: A non-transitory computer-readable medium comprising program code that is executable by one or more processors to cause the one or more processors to: receive a user selection of a file containing visual content to be presented to members of a video conference, wherein the visual content includes pages that are to be sequentially presented to the members during the video conference; facilitate presentation of the visual content to the members of the video conference; obtain metadata associated with at least one page of the visual content presented during the video conference; determine feedback about the at least one page by analyzing the metadata; and provide the feedback to an editor of the visual content.

Example #18: The non-transitory computer-readable medium of Example #17, further comprising program code that is executable by the one or more processors to cause the one or more processors to, after receiving the user selection: generate an adjusted version of the visual content by modifying the visual content based on a profile associated with a member of the video conference; and facilitate the presentation of the adjusted version of the visual content to the members of the video conference.

Example #19: The non-transitory computer-readable medium of Example #18, wherein the profile includes historical data related to the member, and further comprising program code that is executable by the one or more processors to cause the one or more processors to: determine a modification to make to the visual content based on the historical data; and generate the adjusted version of the visual content by applying the modification to the visual content.

Example #20: A system comprising: one or more processors; and one or more memories including instructions that are executable by the one or more processors to cause the one or more processors to: receive a user selection of a file containing visual content to be presented to members of a video conference, wherein the visual content includes pages that are to be sequentially presented to the members during the video conference; facilitate presentation of the visual content to the members of the video conference; obtain metadata associated with at least one page of the visual content presented during the video conference; determine feedback about the at least one page by analyzing the metadata; and provide the feedback to an editor of the visual content.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
    receiving, by one or more processors, a user selection of a file containing visual content to be presented to members of a video conference, wherein the visual content includes pages that are to be sequentially presented to the members during the video conference by a presenter;
    facilitating, by the one or more processors, presentation of the visual content to the members of the video conference;
    obtaining, by the one or more processors, metadata associated with at least one page of the visual content presented during the video conference, wherein the metadata includes video streams of the members of the video conference;

determining, by the one or more processors, feedback about the at least one page by analyzing the metadata; and providing, by the one or more processors, the feedback to an editor of the visual content.

2. The method of claim 1, wherein the metadata further includes audio streams of the members of the video conference.

3. The method of claim 2, further comprising:
determining, using a trained machine-learning model, a sentiment associated with a member of the video conference based on a video stream of the member, the member being different than the presenter; and
determining the feedback based on the sentiment.

4. The method of claim 1, wherein the metadata includes text chat data between at least two members of the video conference other than the presenter.

5. The method of claim 4, further comprising:
analyzing the text chat data using a trained machine-learning model to determine a sentiment associated with a member of the at least two members of the video conference; and
determine the feedback based on the sentiment.

6. The method of claim 1, wherein the metadata includes meeting metrics related to the video conference.

7. The method of claim 1, wherein the metadata includes file usage metrics related to the file, the file usage metrics including a number of times in which the file has been presented, a frequency at which the file has been presented, or a last update time of the file.

8. The method of claim 1, wherein the metadata includes presentation metrics related to the presentation of the visual content.

9. The method of claim 1, wherein the feedback is a recommendation as to how to improve the at least one page of the visual content.

10. The method of claim 1, wherein the editor is software configured to:
receive the feedback; and
after the presentation has ended, automatically adjust a feature of the visual content in the file based on the feedback.

11. The method of claim 10, wherein the feature is a text field in the visual content, and wherein automatically adjusting the feature involves modifying a value of the text field from a first text value to a second text value.

12. The method of claim 10, wherein the feature is a sequential order of the pages in the visual content, and wherein automatically adjusting the feature involves modifying the sequential order from a first order to a second order.

13. The method of claim 1, wherein the visual content is a slideshow and the pages are slides of the slideshow.

14. The method of claim 1, further comprising, after receiving the user selection and prior to facilitating the presentation of the visual content to the members of the video conference:
automatically generating, by the one or more processors, an adjusted version of the visual content by modifying the visual content based on a profile associated with a member of the video conference; and
facilitating the presentation of the adjusted version of the visual content to the members of the video conference.

15. The method of claim 14, wherein the member is the presenter of the visual content in the video conference.

16. The method of claim 14, wherein the member is not the presenter of the visual content in the video conference.

17. A non-transitory computer-readable medium comprising program code that is executable by one or more processors to cause the one or more processors to:
receive a user selection of a file containing visual content to be presented to members of a video conference, wherein the visual content includes pages that are to be sequentially presented to the members during the video conference by a presenter;
facilitate presentation of the visual content to the members of the video conference;
obtain metadata associated with at least one page of the visual content presented during the video conference, wherein the metadata includes video streams of the members of the video conference;
determine feedback about the at least one page by analyzing the metadata; and
provide the feedback to an editor of the visual content.

18. The non-transitory computer-readable medium of claim 17, further comprising program code that is executable by the one or more processors to cause the one or more processors to, after receiving the user selection:
generate an adjusted version of the visual content by modifying the visual content based on a profile associated with a member of the video conference; and
facilitate the presentation of the adjusted version of the visual content to the members of the video conference.

19. The non-transitory computer-readable medium of claim 18, wherein the profile includes historical data related to the member, and further comprising program code that is executable by the one or more processors to cause the one or more processors to:
determine a modification to make to the visual content based on the historical data; and
generate the adjusted version of the visual content by applying the modification to the visual content.

20. A system comprising:
one or more processors; and
one or more memories including instructions that are executable by the one or more processors to cause the one or more processors to:
receive a user selection of a file containing visual content to be presented to members of a video conference, wherein the visual content includes pages that are to be sequentially presented to the members during the video conference by a presenter;
facilitate presentation of the visual content to the members of the video conference;
obtain metadata associated with at least one page of the visual content presented during the video conference, wherein the metadata includes video streams of the members of the video conference;
determine feedback about the at least one page by analyzing the metadata; and
provide the feedback to an editor of the visual content.

* * * * *